United States Patent
Peng et al.

(10) Patent No.: US 11,034,448 B2
(45) Date of Patent: Jun. 15, 2021

(54) UNMANNED AERIAL VEHICLE AND ARM CONNECTION STRUCTURE THEREOF

(71) Applicant: AUTEL ROBOTICS CO., LTD., Guangdong (CN)

(72) Inventors: Huai Peng, Guangdong (CN); Zhengli Zhang, Guangdong (CN); Chun Yu, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 472 days.

(21) Appl. No.: 16/122,181

(22) Filed: Sep. 5, 2018

(65) Prior Publication Data

US 2020/0070974 A1    Mar. 5, 2020

(51) Int. Cl.
*B64C 39/02*      (2006.01)
*F16C 11/04*      (2006.01)

(52) U.S. Cl.
CPC ............ *B64C 39/024* (2013.01); *F16C 11/04* (2013.01); *B64C 2201/024* (2013.01); *B64C 2201/20* (2013.01); *F16C 2326/43* (2013.01)

(58) Field of Classification Search
CPC ............ B64C 39/024; B64C 2201/024; B64C 2201/20; F16C 11/04; F16C 2326/43
See application file for complete search history.

(56) References Cited

U.S. PATENT DOCUMENTS

| | | | |
|---|---|---|---|
| 9,573,683 B2* | 2/2017 | Martin | B64C 39/024 |
| 10,793,270 B2* | 10/2020 | Chen | B64C 39/024 |
| 2010/0108801 A1* | 5/2010 | Olm | B64C 39/024 |
| | | | 244/17.23 |
| 2018/0118322 A1* | 5/2018 | Harris | B64C 39/024 |

* cited by examiner

*Primary Examiner* — Justin M Benedik

(57) ABSTRACT

An arm connection structure for connecting an arm to a body provided in the present invention includes: a connection shaft, a shaft sleeve that can be sleeved on the connection shaft in a manner of rotating relative to the connection shaft, and an elastic member sleeved on the connection shaft. The shaft sleeve is provided with a curved guide slot extending along a peripheral direction of the shaft sleeve, and the connection shaft is provided with a guide block that matches the curved guide slot and that can slide in the curved guide slot. The curved guide slot has a first lock position for locking the arm in an unfolded state, and a second lock position for locking the arm in a folded state. The present invention can make the arm not easily shake in a flight process of an unmanned aerial vehicle, making flight more stable.

12 Claims, 2 Drawing Sheets

UNMANNED AERIAL VEHICLE AND ARM CONNECTION STRUCTURE THEREOF

CROSS REFERENCE

The present application is a continuation of Chinese Patent NO. 2017208998744, filed on Jul. 24, 2017, the disclosure of which is incorporated herein by reference in its entirety.

TECHNICAL FIELD

The present invention relates to the field of unmanned rotorcraft technologies, and specifically, to an arm connection structure and an unmanned aerial vehicle using the arm connection structure.

RELATED ART

Unmanned aerial vehicle related technologies home and abroad are rapidly developed, and greatly differ from each other in a plurality of aspects such as the size, the quality, the voyage, the endurance, the flight height, the flight speed, and the task, leading to a large variety of types, wide uses and distinctive features of unmanned aerial vehicles. Based on a flight platform configuration, an unmanned aerial vehicle may be classified into a fixed-wing unmanned aerial vehicle, an unmanned rotorcraft, an unmanned airship, a parasol-wing unmanned aerial vehicle, a flapping-wing unmanned aerial vehicle, or the like. The unmanned rotorcraft is a product of microelectromechanical system integration, and has become the research focus of many laboratories at home and abroad by its advantages such as vertical take-off and landing, free hovering, flexible control and strong adaptabilities to various environments. A common unmanned rotorcraft has at least three rotor shafts, and the rotor shafts are disposed on an arm extending outward relative to a body. Rotation of motors on the shafts drives rotors, to generate a lifting force. A relative rotational speed between different rotors is changed, so that the magnitude of a single-shaft pushing force can be changed, thereby controlling a movement track of the aircraft. However, because the arm of this type of unmanned rotorcraft extends outward relative to the body and is fixed to the body, the arm cannot rotate relative to the body. Consequently, the arm cannot be folded. Such an unmanned rotorcraft has disadvantages of a relatively large volume and inconvenient carriage.

Therefore, an unmanned aerial vehicle whose arm can be folded relative to a body appears. However, this type of unmanned aerial vehicle still has some defects. An arm connection structure adopted in this type of unmanned aerial vehicle makes the unmanned aerial vehicle easily shake in a flight process. Consequently, flight of the unmanned aerial vehicle is unstable.

SUMMARY

Therefore, the technical problem to be resolved in the present invention is to overcome the defect in the prior art that an arm connection structure makes an unmanned aerial vehicle shake in a flight process, leading to unstable flight, and provide an arm connection structure.

Therefore, the present invention adopts the following technical solutions:

an arm connection structure, configured to rotatably connect an arm to a body, and including:

a connection shaft, mounted on the body;

a shaft sleeve, sleeved on the connection shaft, and capable of moving along an axial direction of the connection shaft, where the shaft sleeve can rotate with the arm;

where the shaft sleeve is provided with a curved guide slot extending along a peripheral direction of the shaft sleeve, and the connection shaft is provided with a guide block that matches the curved guide slot and that can slide in the curved guide slot; or the shaft sleeve is provided with a curved guide slot extending along a peripheral direction of the shaft sleeve, and the connection shaft is provided with a guide block that matches the curved guide slot and that can slide in the curved guide slot; and an elastic member, where the elastic member is sleeved on the connection shaft, and one end of the elastic member abuts against the shaft sleeve, and the other end abuts against the body, where the curved guide slot has an extreme position and a first lock position and a second lock position that are located on two sides of the extreme position; when the guide block slides to the first lock position, the arm is in an unfolded state, and when the guide block slides to the second lock position, the arm is in a folded state.

In an embodiment of the present invention, the extreme position is a highest point or a lowest point of the curved guide slot.

In an embodiment of the present invention, the curved guide slot is a smooth curved guide slot.

In an embodiment of the present invention, the curved guide slot is a cam guide slot.

In an embodiment of the present invention, the guide block is cylindrical.

In an embodiment of the present invention, the arm connection structure further includes a socket sleeved on the shaft sleeve, and the socket is fixedly connected to the arm; and a shape of an inner wall of the socket matches a shape of an outer wall of the shaft sleeve, so that the socket cannot rotate relative to the shaft sleeve.

To solve the technical problem thereof, the present invention further provides an unmanned aerial vehicle, including a body, an arm, and an arm connection structure configured to rotatably connect the arm to the body, where the arm connection structure includes:

a connection shaft, mounted on the body;

a shaft sleeve, sleeved on the connection shaft, and capable of moving along an axial direction of the connection shaft, where the shaft sleeve can rotate with the arm;

where the shaft sleeve is provided with a curved guide slot extending along a peripheral direction of the shaft sleeve, and the connection shaft is provided with a guide block that matches the curved guide slot and that can slide in the curved guide slot; or the shaft sleeve is provided with a curved guide slot extending along a peripheral direction of the shaft sleeve, and the connection shaft is provided with a guide block that matches the curved guide slot and that can slide in the curved guide slot; and an elastic member, where the elastic member is sleeved on the connection shaft, and one end of the elastic member abuts against the shaft sleeve, and the other end abuts against the body, where the curved guide slot has an extreme position and a first lock position and a second lock position that are located on two sides of the extreme position; when the guide block slides to the first lock position, the arm is in an unfolded state, and when the guide block slides to the second lock position, the arm is in a folded state.

In an embodiment of the present invention, the extreme position is a highest point or a lowest point of the curved guide slot.

In an embodiment of the present invention, the curved guide slot is a smooth curved guide slot.

In an embodiment of the present invention, the curved guide slot is a cam guide slot.

In an embodiment of the present invention, the guide block is cylindrical.

In an embodiment of the present invention, the arm connection structure further includes a socket sleeved on the shaft sleeve, and the socket is fixedly connected to the arm; and a shape of an inner wall of the socket matches a shape of an outer wall of the shaft sleeve, so that the socket cannot rotate relative to the shaft sleeve.

The technical solutions of the present invention have the following advantages:

According to an arm connection structure provided in the present invention, a cam guide slot and a guide block are provided; when an arm needs to be switched between unfolded and folded states, the arm is rotated to drive a shaft sleeve or a connection shaft linked with the arm, so that the guide block slides in the cam guide slot based on a shape of the cam guide slot; when the guide block slides to a first lock position or a second lock position of the cam guide slot, the arm is locked in the unfolded state or the folded state under the effect of an elastic member, so that the arm completes switching and locking between the unfolded state and the folded state. Regarding this manner in which the guide block slides in the cam guide slot to implement state switching, because the guide block slides based on the shape of the cam guide slot, and a slide track of the guide block is completely and strictly limited by the shape of the cam guide slot, sliding of the guide block in the entire switching process is stable, and the unmanned aerial vehicle does not easily shake in the flight process, thereby making the flight more stable.

BRIEF DESCRIPTION OF THE DRAWINGS

To describe the technical solutions in specific implementations of the present invention or in the prior art more clearly, the following briefly introduces the accompanying drawings required for describing the specific implementations or the prior art. Apparently, the accompanying drawings in the following description show only some implementations of the present invention, and a person of ordinary skill in the art may still derive other drawings from these accompanying drawings without creative efforts.

DESCRIPTION OF REFERENCE SIGNS

1-Arm; 2-Body; 3-Connection shaft; 4-Shaft sleeve; 5-Curved guide slot; 6-Guide block; 7-Elastic member; 8-Socket.

DETAILED DESCRIPTION

The following clearly and completely describes the technical solutions of the present invention with reference to the accompanying drawings. Apparently, the described embodiments are some of the embodiments of the present invention, rather than all the embodiments of the present invention. All other embodiments obtained by a person of ordinary skill in the art based on the embodiments in the present invention without creative efforts shall fall within the protection scope of the present invention.

In the description of the present invention, it should be noted that orientation or position relationships indicated by terms such as "center", "on", "below", "left", "right", "vertical", "horizontal", "inside", and "outside" are based on orientation or position relationships shown in the accompanying drawings, and are used only for facilitating describing the present invention and simplifying the description, rather than indicating or implying that the mentioned apparatus or component needs to have a specific orientation, and needs to be constructed and operated in the specific orientation, and therefore the terms cannot be understood as a limitation to the present invention. Moreover, the terms "first", "second", and "third" are used only for descriptive purposes, and cannot be construed as indicating or implying relative importance.

In the description of the present invention, it should be noted that unless otherwise explicitly stipulated and defined, the terms "mounting", "connected", and "connection" should be understood in a broad sense. For example, the connection may be a fixed connection, a detachable connection, or an integral connection; the connection may be a mechanical connection, or an electric connection; the connection may be a direct connection, an indirect connection through an intermediary, or internal communication between two components. For a person of ordinary skill in the art, specific meanings of the foregoing terms in the present invention may be understood based on specific cases.

In addition, the technical features involved in different embodiments of the present invention described below can be combined with each other provided that they do not form a conflict with each other.

Figure 1:
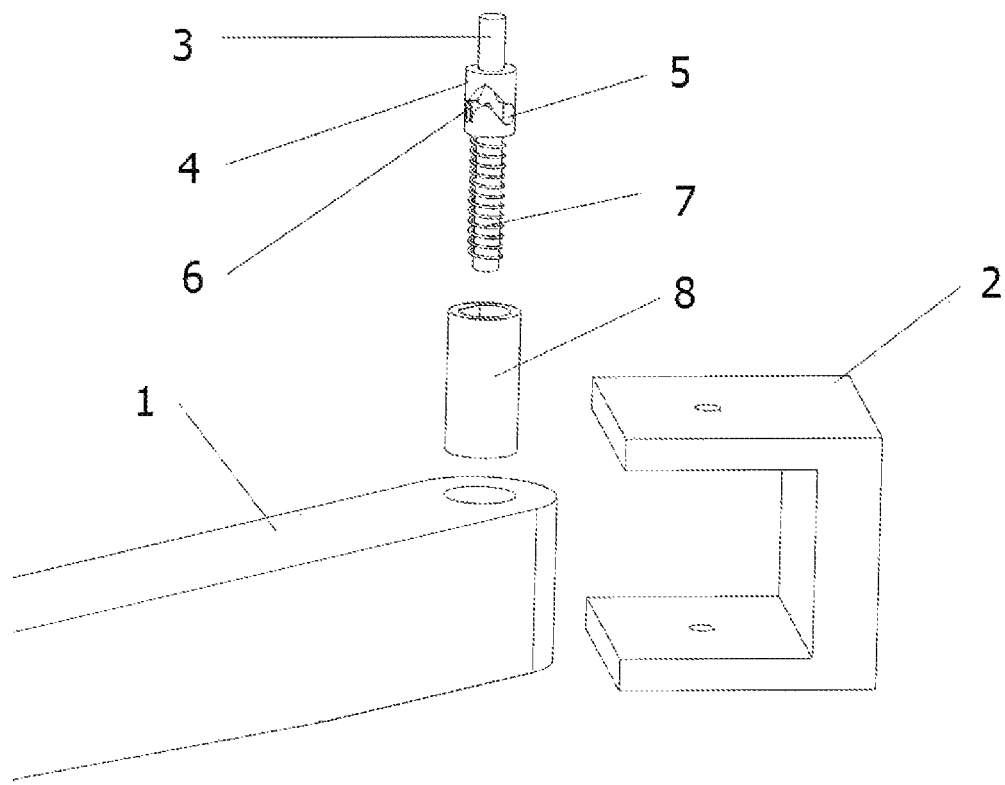
FIG. 1 is an exploded view of an arm connection structure according to an embodiment of the present invention.
Figure 2:
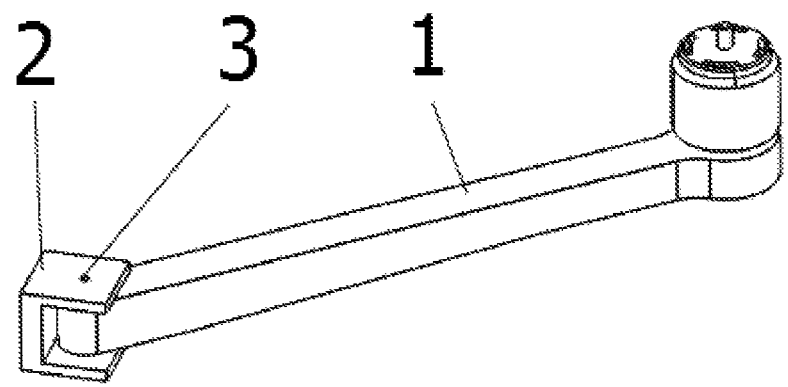
FIG. 2 is a schematic diagram showing that the arm connection structure shown in FIG. 1 is in an unfolded state.
Figure 3:
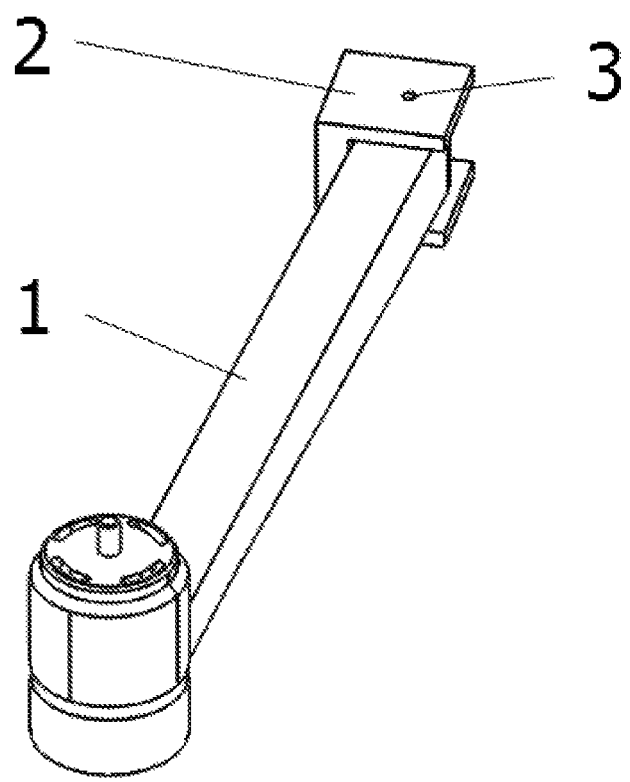
FIG. 3 is a schematic diagram showing that the arm connection structure shown in FIG. 1 is in a folded state.

As shown in FIG. 1, an arm connection structure provided in this embodiment includes a connection shaft 3, a shaft sleeve 4, an elastic member 7 and a socket 8. Two ends of the connection shaft 3 are fixedly connected to a body of an unmanned aerial vehicle. The socket 8 is disposed in an arm of the unmanned aerial vehicle, and can rotate with the arm. The shaft sleeve 4 is sleeved on the connection shaft 3, and is located in the socket 8. The shaft sleeve 4 rotates with the socket 8. In an embodiment of the present invention, the shape of an inner wall of the socket 8 matches the shape of an outer wall of the shaft sleeve 4, so that the socket 8 cannot rotate relative to the shaft sleeve 4. In this embodiment, an outer wall of the socket 8 tightly matches a hole wall of the arm, to implement a fixed connection between the socket 8 and the arm. An outer surface of the shaft sleeve 4 is set to a non-cylindrical surface obtained by cutting a cylinder by a plane parallel to an axial direction of the connection shaft 3. Correspondingly, the inner wall of the socket 8 is also a non-cylindrical surface having the same shape, so that relative rotation cannot be performed between the shaft sleeve 4 and the socket 8.

In addition, the shaft sleeve 4 can also slide along the axial direction of the connection shaft 3. The elastic member 7 is also disposed in the socket 8. One end of the elastic member 7 abuts against the shaft sleeve 4, and the other end of the elastic member 7 abuts against the arm. In this embodiment, the elastic member 7 is a spring.

In other possible embodiments, alternatively, the connection shaft 3 is fixedly connected to the arm, and the shaft sleeve 4 is linked with the body 2.

In this embodiment, the shaft sleeve 4 is provided with a curved guide slot 5 extending along a peripheral direction of the shaft sleeve 4, and the connection shaft 3 is correspondingly provided with a guide block 6 that matches the curved guide slot 5 and that can slide in the curved guide slot 5. In other possible embodiments, alternatively, the connection shaft is provided with a curved guide slot extending along a peripheral direction thereof, and the shaft sleeve is correspondingly provided with a guide block that matches the curved guide slot and that can slide in the curved guide slot. In an embodiment of the present invention, the curved guide slot 5 is a smooth cam guide slot. In other possible embodiments, the curved guide slot 5 may also be a parabola-like smooth curved slot, a "W"-like smooth curved slot, a smooth curved slot with two ends being smoothly transitioned, and a middle part being provided with a section of straight line, or the like. The curved guide slot 5 is set to a smooth curved slot, so that resistance during sliding of the guide block 6 in the curved guide slot 5 can be reduced, thereby making the sliding of the guide block 6 smoother.

In an embodiment of the present invention, the curved guide slot 5 includes an extreme position and a first lock position and a second lock position that are respectively disposed on two sides of the extreme position. When the guide block 6 is located at the first lock position, the arm connection structure locks the arm in an unfolded state. When the guide block 6 is located at the second lock position, the arm connection structure locks the arm in a folded state. The extreme position may be a highest point of the curved guide slot 5, or a lowest point of the curved guide slot 5.

In this embodiment, there is an extreme position between the first lock position and the second lock position. When the guide block 6 slides from one lock position to across the extreme position, the guide block 6 is enabled, by means of the effect of an elastic restoring force of the elastic member 7, to automatically slide into the another lock position. When the guide block slides from one lock position to the extreme position, the extreme position enables the guide block to rapidly slide to the another lock position, thereby preventing the guide block 6 from residing at other transitional positions. When the guide block 6 resides at other transitional positions, the arm in unfolded state is unstable during flight of an unmanned aerial vehicle. Consequently, the aim shakes, and even returns to the folded state, making the unmanned aerial vehicle drop down, leading to explosion.

In an embodiment of the present invention, the first lock position and the second lock position are respectively located on two ends of the curved guide slot 5. The first lock position and the second lock position are respectively disposed on two ends of a cam guide slot 5, so that the curved guide slot 5 can be fully used, and has no redundant and unused parts, thereby reducing processing costs and processing steps. In other possible embodiments, the first lock position or the second lock position may also be disposed at an intermediate position of the curved guide slot 5, and an extreme position is disposed on either side of the first lock position or the second lock position. For example, when the curved guide slot 5 is a "W"-like smooth curved slot, two extreme positions are respectively two "W"-like lowest positions.

When the arm needs to be switched between unfolded and folded states, the arm is rotated to drive the shaft sleeve 4 or the connection shaft 3 linked with the arm to rotate, so that the guide block 6 slides in the curved guide slot 5 based on the shape of the curved guide slot 5. When the guide block 6 slides to the first lock position or the second lock position of the curved guide slot 5, the arm is locked in the unfolded state or the folded state under the effect of the elastic restoring force of the elastic member, thereby completing switching and locking between the unfolded state and the folded state by the arm. Regarding this manner in which the guide block 6 slides in the curved guide slot 5 to switch between unfolded and folded states of the arm, because the guide block 6 slides based on the shape of the curved guide slot 5, and a slide track of the guide block 6 is completely and strictly limited by the shape of the curved guide slot 5, sliding of the guide block 6 in the entire switching process is stable, and the unmanned aerial vehicle does not easily shake in the flight process, thereby making movement execution in the process of switching between the unfolded and folded states of the arm more reliable, and making the flight more stable.

In this embodiment, the curved guide slot 5 is formed on a peripheral wall of the shaft sleeve 4, and the guide block 6 is formed on a peripheral wall of the connection shaft 3. The curved guide slot 5 and the guide block 6 are respectively formed on the peripheral wall of the shaft sleeve 4 or the peripheral wall of the connection shaft 3, so that the peripheral wall of the curved guide slot 5 is completely closed, and a movement track of the guide block 6 matching the curved guide slot 5 in the curved guide slot 5 is fixed. In this way, the following problem is avoided: in the process of switching between the unfolded and folded states, the guide block 6 does not move based on the movement track in the curved guide slot 5. In this way, the guide block 6 does not depart from the movement track on the curved guide slot 5, thereby making movement execution in the state switching process more reliable.

In an embodiment of the present invention, the guide block 6 is a cylindrical block. The guide block 6 is set to a cylindrical block, so that sliding of the guide block 6 along the curved guide slot 5 is smoother. In other possible embodiments, the guide block 6 may alternatively be a block having another shape and a smooth curved surface.

When the arm is in the folded state, the guide bloc 6 is located at the second lock position of the curved guide slot 5. In this case, if the unmanned aerial vehicle needs to be used, the arm of the unmanned aerial vehicle needs to be adjusted to the unfolded state from the folded state. Specifically, first, the arm is rotated by using an external force, the arm is linked with the socket 8, and the socket 8 is linked with the shaft sleeve 4, so that the shaft sleeve 4 rotates relative to the connection shaft 3 fixedly connected to the body 2, making the guide block 6 disposed on the connection shaft 3 slide along the curved guide slot 5 disposed on the shaft sleeve 4. The curved guide slot 5 is a cam guide slot. A highest point of the cam guide slot is an extreme position of the curved guide slot 5. Two lowest points of the cam guide slot are respectively the first lock position and the second lock position. In this case, the shaft sleeve 4 overcomes the elastic restoring force of the elastic member 7 under the effect of the external force, to move along the axial direction of the connection shaft 3. The guide block 6 departs from the second lock position, and moves towards the extreme position along the curved guide slot 5. When the guide block 6 crosses the extreme position of the curved guide slot 5, the elastic restoring force applied by the elastic member 7 to the shaft sleeve 4 can make the guide block 6 automatically slide into the first lock position, and under the effect of the elastic restoring force of the elastic member 7, the guide block 6 is locked at the first lock position, thereby locking the arm in the unfolded state. Similarly, when the arm of the unmanned aerial vehicle is in the unfolded state, the guide block 6 is located at the first lock position of the curved guide slot 5. In this case, if the unmanned aerial vehicle needs to be folded, the arm is rotated in the same manner, so that the guide block 6 departs from the first lock position, and overcomes the elastic restoring force of the elastic member 7 to move towards the extreme position. When crossing the extreme position, under the effect of the elastic restoring force of the elastic member 7, the guide block 6 can automatically slide into the second lock position, and is locked at the second lock position by the elastic restoring force of the elastic member 7, thereby locking the arm in the folded state.

This embodiment provides an unmanned aerial vehicle, including a body 2 and an arm 1, and further including the foregoing arm connection structure connecting the body 2 to the arm 1. Because the unmanned aerial vehicle adopts the foregoing arm connection structure, the unmanned aerial vehicle does not easily shake in the flight process, thereby making movement execution in the process of switching between the unfolded and folded states of the arm more reliable, and making the flight more stable.

Apparently, the foregoing embodiments are merely examples for clear description, rather than a limitation to implementations. For a person of ordinary skill in the art, other changes or variations in different forms may also be made based on the foregoing description. All implementations do not need to be listed herein. Obvious changes or variations that are derived therefrom still fall within the protection scope of the creation of the present invention.

What is claimed is:

1. An arm connection structure, configured to rotatably connect an arm to a body, wherein the arm connection structure comprises:
    a connection shaft, mounted on the body;
    a shaft sleeve, sleeved on the connection shaft, and capable of moving along an axial direction of the connection shaft, wherein the shaft sleeve can rotate with the arm;
    wherein the shaft sleeve is provided with a curved guide slot extending along a peripheral direction of the shaft sleeve, and the connection shaft is provided with a guide block that matches the curved guide slot and that can slide in the curved guide slot; or
    the shaft sleeve is provided with a curved guide slot extending along a peripheral direction of the shaft sleeve, and the connection shaft is provided with a guide block that matches the curved guide slot and that can slide in the curved guide slot; and
    an elastic member, wherein the elastic member is sleeved on the connection shaft, and one end of the elastic member abuts against the shaft sleeve, and the other end abuts against the body, wherein
    the curved guide slot has an extreme position and a first lock position and a second lock position that are located on two sides of the extreme position; when the guide block slides to the first lock position, the arm is in an unfolded state, and when the guide block slides to the second lock position, the arm is in a folded state.

2. The arm connection structure according to claim 1, wherein the extreme position is a highest point or a lowest point of the curved guide slot.

3. The arm connection structure according to claim 1, wherein the curved guide slot is a smooth curved guide slot.

4. The arm connection structure according to claim 3, wherein the curved guide slot is a cam guide slot.

5. The arm connection structure according to claim 1, wherein the guide block is cylindrical.

6. The arm connection structure according to claim 1, wherein the arm connection structure further comprises a socket sleeved on the shaft sleeve, and the socket is fixedly connected to the arm;
    wherein a shape of an inner wall of the socket matches a shape of an outer wall of the shaft sleeve, so that the socket cannot rotate relative to the shaft sleeve.

7. An unmanned aerial vehicle, comprising a body, an arm, and an arm connection structure configured to rotatably connect the arm to the body, wherein the arm connection structure comprises:
    a connection shaft, mounted on the body;
    a shaft sleeve, sleeved on the connection shaft, and capable of moving along an axial direction of the connection shaft, wherein the shaft sleeve can rotate with the arm;
    wherein the shaft sleeve is provided with a curved guide slot extending along a peripheral direction of the shaft sleeve, and the connection shaft is provided with a guide block that matches the curved guide slot and that can slide in the curved guide slot; or
    the shaft sleeve is provided with a curved guide slot extending along a peripheral direction of the shaft sleeve, and the connection shaft is provided with a guide block that matches the curved guide slot and that can slide in the curved guide slot; and
    an elastic member, wherein the elastic member is sleeved on the connection shaft, and one end of the elastic member abuts against the shaft sleeve, and the other end abuts against the body, wherein
    the curved guide slot has an extreme position and a first lock position and a second lock position that are located on two sides of the extreme position; when the guide block slides to the first lock position, the arm is in an unfolded state, and when the guide block slides to the second lock position, the arm is in a folded state.

8. The unmanned aerial vehicle according to claim 7, wherein the extreme position is a highest point or a lowest point of the curved guide slot.

9. The unmanned aerial vehicle according to claim 7, wherein the curved guide slot is a smooth curved guide slot.

10. The unmanned aerial vehicle according to claim 9, wherein the curved guide slot is a cam guide slot.

11. The unmanned aerial vehicle according to claim 7, wherein the guide block is cylindrical.

12. The unmanned aerial vehicle according to claim 7, wherein the arm connection structure further comprises a socket sleeved on the shaft sleeve, and the socket is fixedly connected to the arm; and
    a shape of an inner wall of the socket matches a shape of an outer wall of the shaft sleeve, so that the socket cannot rotate relative to the shaft sleeve.

* * * * *